US009195941B2

(12) United States Patent
Mojsilovic et al.

(10) Patent No.: US 9,195,941 B2
(45) Date of Patent: Nov. 24, 2015

(54) PREDICTIVE AND DESCRIPTIVE ANALYSIS ON RELATIONS GRAPHS WITH HETEROGENEOUS ENTITIES

(71) Applicant: International Business Machines Corporation, Armonk, NY (US)

(72) Inventors: Aleksandra Mojsilovic, New York, NY (US); Kush R. Varshney, Ossining, NY (US); Jun Wang, While Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/868,644

(22) Filed: Apr. 23, 2013

(65) Prior Publication Data

US 2014/0317033 A1  Oct. 23, 2014

(51) Int. Cl.
*G06N 5/04* (2006.01)
*G06N 5/02* (2006.01)
*G06Q 10/00* (2012.01)
*G06N 7/00* (2006.01)

(52) U.S. Cl.
CPC ............... *G06N 5/02* (2013.01); *G06Q 10/00* (2013.01); *G06N 5/04* (2013.01); *G06N 7/005* (2013.01)

(58) Field of Classification Search
None
See application file for complete search history.

(56) References Cited

U.S. PATENT DOCUMENTS

| 7,805,010 | B2 | 9/2010 | Posse et al. |
|---|---|---|---|
| 2010/0223266 | A1 | 9/2010 | Balmin et al. |
| 2012/0096042 | A1 | 4/2012 | Brockett et al. |
| 2014/0317038 | A1* | 10/2014 | Mojsilovic et al. ............ 706/46 |

FOREIGN PATENT DOCUMENTS

WO   WO 2011151500   12/2011

* cited by examiner

*Primary Examiner* — Wilbert L Starks
(74) *Attorney, Agent, or Firm* — Scully, Scott, Murphy & Presser, P.C.; Daniel P. Morris, Esq.

(57) ABSTRACT

A system, method and computer program product provides a random walk model with heterogeneous graphs to leverage multiple source data and accomplish prediction tasks. The system and method components include: 1) A heterogeneous graph formulation including heterogeneous instances of abstract objects as graph nodes and multiple relations as edges connecting those nodes. The different types of relations, such as client-vendor relation and client-product relation, are often quantified as the weights of edges connecting those entities; 2) To accomplish prediction tasks with such information, launching a multi-stage random walk model over the heterogeneous graph. The random walk within a subgraph with homogenous nodes usually produces the relevance between entities of the same type. The random walk across different type of nodes provides the prediction of decisions, such as a client purchasing a product.

8 Claims, 5 Drawing Sheets

Initialization:

Construct legislator graph $G_{(x)} = \{V_{(x)}, E_{(x)}, W_{(x)}\}$, bill graph $G_{(y)} = \{V_{(y)}, E_{(y)}, W_{(y)}\}$, and vote graphs $G_{(xy)}^{yea} = \{V_{(x)} \cup V_{(y)}, E_{(xy)}^{yea}, W_{(xy)}^{yea}\}$ and $G_{(xy)}^{nay} = \{V_{(x)} \cup V_{(y)}, E_{(xy)}^{nay}, W_{(xy)}^{nay}\}$; ⎫ ⎬ — 105

Compute transition probabilities $P_{(x)}$ and $P_{(y)}$; — 110

Derive steady-state distributions $R_{(x)}$ and $R_{(y)}$; — 115 iteration counter $t = 0$; — 117

Compute the initial bipartite graph transition probability matrices $P_{(xy)}^{yea}(t)$ and $P_{(xy)}^{nay}(t)$ using (eq.16); — 119 repeat.

Compute the bipartite graph transition probability matrices $P_{(xy)}^{yea}(t+1)$ and $P_{(xy)}^{nay}(t+1)$ using (eq.18); — 120

Estimate the posterior probabilities $P_{(ln)}^{yea}$ and $P_{(ln)}^{nay}$ for each possible vote link using (eq.19); — 122

For each possible prediction vote link, estimate the mutual information $I(X_l, Y_n)$ of the legislator and bill vertices (eq. 20); — 124

Update vote link $W_{(xy)}^{yea}$ or $W_{(xy)}^{nay}$ from the prediction with maximum mutual information, as in (eq. 22); — 126

Update iteration counter: $t = t + 1$; — 127 compute $P_{(xy)}^{yea}(t)$ or $P_{(xy)}^{nay}(t)$ with the new vote graphs; — 129 until All missing vote links are completed

Output:

The complete vote links $W_{(xy)}^{yea}$ and $W_{(xy)}^{nay}$ — 135

FIG. 2

PREDICTIVE AND DESCRIPTIVE ANALYSIS ON RELATIONS GRAPHS WITH HETEROGENEOUS ENTITIES

BACKGROUND

The present disclosure generally relates to the field of prediction analysis and building predictive models for applications, and more specifically to a system and method for building a random walk model with heterogeneous graphs to leverage multiple source data for prediction tasks.

Many predictive analytics problems involve a variety of different types of data. For example, in building a predictive model to generate sales recommendations, one might consider both the relationships between clients and the attributes of clients' industry and the characteristics of the products. In another example of legislative prediction, where the goal is to predict the votes from legislators on future bills, both political and social relationships between legislators and the semantic description of bills are available for predictive analysis. Besides predicting who might buy which product, or who might vote yea/nay on a bill, estimating the influence of entities (e.g., clients or legislators) is also very important for decision support.

Most of the existing learning methods rely on feature-based data representation by vectors in a predefined metric space, which lacks the capacity to handle relational information. Emerging techniques for social network analysis, such as relational learning, usually focus on homogenous relational links of single type of samples. To apply these methods for analyzing such complex heterogeneous data, one has to simplify and degrade the heterogeneous sources, such as summing multiple relation links in a heuristic way, which often results in information loss and unsatisfactory prediction accuracy. In addition, many important problems, such as estimating the influencers, do not even fit into this simplification scheme and far less advances have been made for complex data represented in such a heterogeneous way.

Therefore, there exists emerging need to develop tools and models to incorporate such heterogeneous data to: 1) perform efficient prediction or recommendation, and 2) identify the most influential entities.

BRIEF SUMMARY

A system, method and computer program product provides a random walk model with heterogeneous graphs to leverage multiple source data and accomplish prediction tasks.

The system and method includes components including: 1) A heterogeneous graph formulation including heterogeneous instances of abstract objects as graph nodes and multiple relations as edges connecting those nodes. For instance, in a typical business analytics application, the clients, and vendors, are treated as graph nodes. The different types of relations, such as client-vendor relation and client product relation, are often quantified as the weights of edges connecting those entities; 2) To accomplish prediction tasks with such rich information, a multi-stage random walk model over the heterogeneous graph is launched. The random walk within a subgraph with homogenous nodes usually produces the relevance between entities of the same type. The random walk across different type of nodes provides the prediction of decisions, such as a client purchasing a product.

With the proposed system and methods, one can 1) perform the predictive analysis simultaneously using multiple type relational data and attribute data without data aggregation or simplification, avoiding information loss; 2) perform a descriptive analysis of the influence estimate in a joint space of multiple types of entities.

In one aspect, there is provided a method of predicting a relation between entities comprising: constructing, at a computer device, a heterogeneous graph representation of multi-source data including: receiving data for forming multiple unipartite sub-graphs, each sub-graph having homogeneous vertices and edges connecting the vertices, and receiving data for forming bipartite sub-graphs having partially observed edges connecting respective nodes between any two different unipartite sub-graphs, the partially observed edges representing cross-entity links; computing at the computer device, a steady-state relevance matrix for each sub-graph using a homogeneous Markov Random Walk model applied to each the unipartite sub-graph; dynamically generating missing edges connecting vertices between each of two unipartite sub-graphs by applying, using the computed steady-state relevance matrix for each sub-graph, an iterative and heterogeneous Markov Random Walk model to the bipartite sub-graphs to dynamically generate missing edges, wherein a generated missing edge represents a cross-entity connection recommendation or prediction in the heterogeneous graph, wherein a programmed processor unit of the computer device performs the receiving, constructing, applying the first Markov Random Walk model to each the unipartite sub-graph and applying the iterative Markov Random Walk model to the bipartite sub-graphs.

According to a further aspect, there is provided a computer-implemented system for predicting a relation between entities comprising: a memory storage device; a computer system associated with the memory storage device, the computer system including a processor device configured to perform a method to: construct, at a computer device, a heterogeneous graph representation of multi-source data including: receiving data for forming multiple unipartite sub-graphs, each sub-graph having homogeneous vertices and edges connecting the vertices, and receiving data for forming bipartite sub-graphs having partially observed edges connecting respective nodes between any two different unipartite sub-graphs, the partially observed edges representing cross-entity links; compute at the computer device, a steady-state relevance matrix for each sub-graph using a homogeneous Markov Random Walk model applied to each the unipartite sub-graph; dynamically generate missing edges connecting vertices between each of two unipartite sub-graphs by applying, using the computed steady-state relevance matrix for each sub-graph, an iterative and heterogeneous Markov Random Walk model to the bipartite sub-graphs to dynamically generate missing edges, wherein a generated missing edge represents a cross-entity connection recommendation or prediction in the heterogeneous graph.

In a further aspect, a computer program product is provided for performing operations. The computer program product includes a storage medium readable by a processing circuit and storing instructions run by the processing circuit for running a method. The method is the same as listed above.

BRIEF DESCRIPTION OF THE DRAWINGS

Various objects, features and advantages of the present invention will become apparent to one skilled in the art, in view of the following detailed description taken in combination with the attached drawings, in which:

FIG. 2 illustrates an algorithm to perform Iterative Vote Link Prediction through Random Walk over a Heterogeneous Graph in one embodiment;

DETAILED DESCRIPTION

Figure 1:
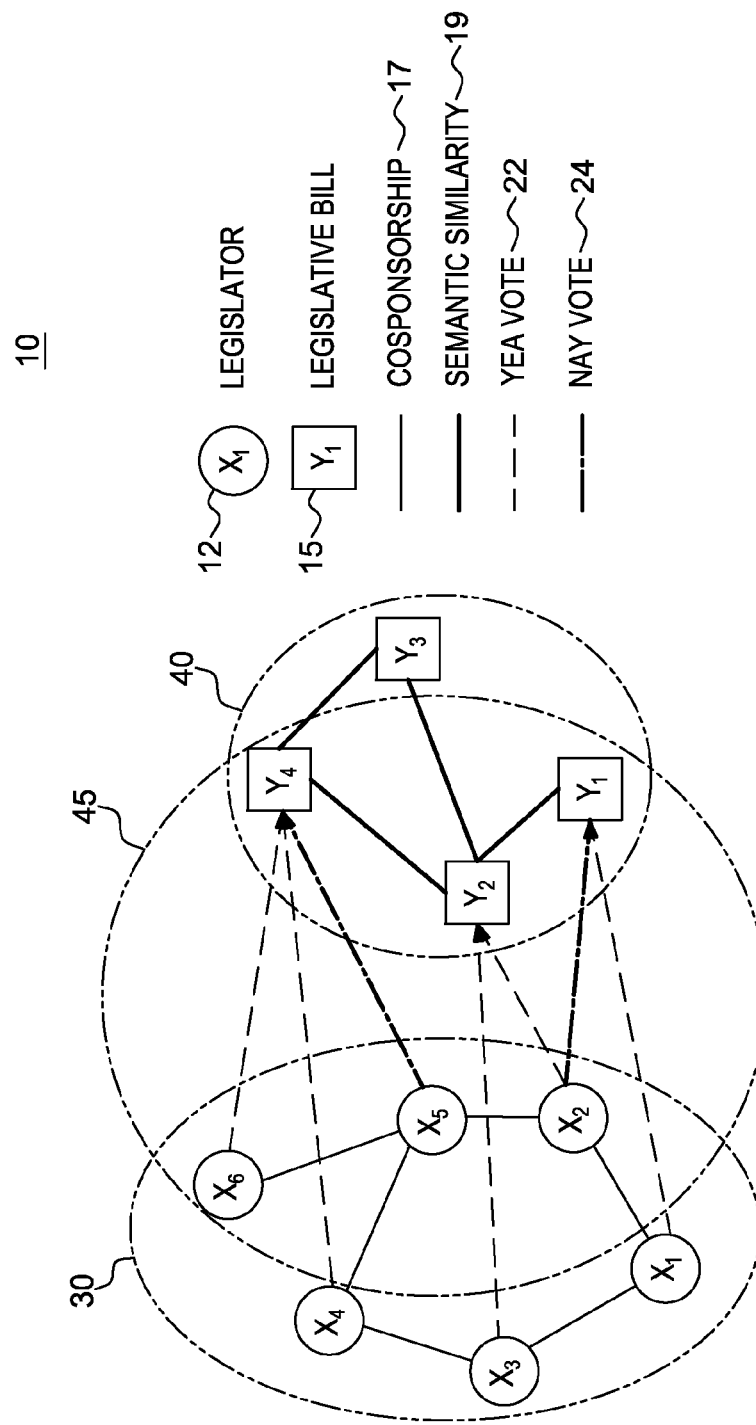
FIG. 1 depicts a heterogeneous graph representation of roll call data from the Congress of the United States of America.

A system, method and computer program product for providing a random walk model with heterogeneous graphs to leverage multiple source data and accomplish challenging prediction tasks, is provided. The system, method and computer program product is applicable to any application using predictive analytics.

For purposes of description herein, the novel random walk model with heterogeneous graphs is described herein in the context of a political science application, namely, the build of a random walk-based model to predict a legislators' votes on a set of proposed laws or "bills". The principles of the novel random walk model with heterogeneous graphs as described herein is applicable to many other applications that could benefit from using predictive analytics, e.g., managing buying-selling relations across hybrid networks.

Humanistic and social studies, including anthropology, criminology, marketing, sociology, and urban planning are increasingly turning to data-driven quantitative methods, informatics, and predictive analytics. Political science is no different. Politics in democracies are centered around votes on bills in legislatures. Voting history, also known as roll call data, is an important historical record that has been studied statistically since the 1920s, if not earlier.

Following other political science studies, one focus is on the legislature of the federal government of the United States of America, known as the Congress. An important feature of the United States Congress is that legislators are not bound to vote in lockstep with their party. In contrast to parliamentary governments, such as those that follow the Westminster system, party affiliation is not codified in the constitution and thus is only one of many factors that go into determining whether a legislator votes yea or nay. Congress is a bicameral legislature composed of the Senate with 100 members known as senators, and the House of Representatives with 435 members known as representatives. A session of Congress lasts two years. The composition of Congress changes after every session due to elections. Within a session, the only changes are due to death or resignation.

A bill is a proposed law under consideration by a legislature, that if passed, becomes a law. Each bill that comes to a vote in Congress is sponsored by at least one legislator. Other legislators may cosponsor the bill if they coauthored it or if they wish to publicly indicate strong support for it in advance of the vote. Thus, frequent cosponsorship of bills reflects collaboration and similarity in ideology between legislators.

Roll call data can be analyzed to obtain a variety of descriptive statistics, but can also be used in developing predictive models. Legislative prediction leads to a better understanding of government and can also provide actionable insights to political strategists. It is a challenging task to predict the votes of all current legislators on a bill that has not yet been voted upon.

To leverage both text mining of bills and the social connection between legislators to predict legislative votes, there is provided a model based on random walks on a heterogeneous graph (RWHG) to predict the vote links between legislators and bills. In this formulation, the roll call data is represented as a heterogeneous graph, where both legislators and bills are treated as vertices. The legislators are connected based on political relationship, specifically cosponsorship, and the bills are connected based on their semantic similarity in the bag-of-words (BOW) representation space. The votes, yea or nay, are treated as directed edges of a bipartite-style legislator-bill graph. Based on this formulation, a two-stage random walk is performed over the heterogeneous graph to iteratively generate vote links.

For predictive analysis in this context, there is generated a heterogeneous graph to represent the roll call data, where both the legislators and bills are treated as graph vertices. The legislator vertices are connected based on their social and political relationships, quantified with edge weights. Similarly, the bills are connected based on their estimated semantic similarity. The votes are treated as the links of a bipartite-style legislator-bill graph. Overall, this unique formulation has a heterogeneous-structured graph with two types of vertices and three types of edges.

Graph Notations

There is first defined a graph notation for the legislators. Assuming there are a total of L legislators, a set of legislator vertices is denoted as $V_{(x)}=\{x_1, \ldots, x_l, \ldots, x_L\}$ with cardinality $|V_{(x)}|=L$. These legislators can be connected based on attributes such as party, state, age, gender, and cosponsorship by converting the attributes to a political similarity measure between legislators. In other words, the legislators form a graph $G_{(x)}=\{V_{(x)}, E_{(x)}\}$ independently, with an edge set $E_{(x)}=\{e_{(x)_{lm}}\} \subset V_{(x)} \times V_{(x)}$ (l, m=1, ..., L). The details for estimating political similarity, i.e. the weight of the edges, are described in greater detail below.

There is further defined the set of bills as $V_{(y)}=\{y_1, \ldots, y_n, \ldots, y_N\}$ with cardinality $|V_{(y)}|=N$. Given textual content, the same symbol is reused to represent the standard bag-of-words (BOW) model of bills as $y_n \in R^B$, where B is the size of the dictionary. Accordingly, the bills form a graph in the semantic space, where the set of vertices $V_{(y)}$ represents the bills and the set of edges $E_{(y)}=\{e_{(y)_{nk}}\} \subset V_{(y)} \times V_{(y)}$ (n, k=1, ..., N) connects bills based on their semantic similarity. Therefore, the bill graph represented as $G_{(y)}=\{V_{(y)}, E_{(y)}\}$.

An additional piece of information to leverage into the graph formulation is the initially-given set of votes, i.e. the yea or nay results for the legislators voting on the bills. Since each vote involves two types of vertices, one legislator and one bill, the vote can be viewed as a special type of directed edge or link across these heterogeneous vertices. This gives the third component of the heterogeneous graph formulation, a bipartite structured vote graph $G_{(xy)}=\{V, E_{(xy)}\}$, where $V=V_{(x)} \cup V_{(y)}$ and $E_{(xy)}=\{e_{(xy)_{ln}}\} \subset V_{(x)} \times V_{(y)}$ (l=1, ..., L, n=1, ..., N).

In summary, the heterogeneous graph G contains three subgraphs: legislator graph $G_{(x)}$, bill graph $G_{(y)}$, and vote graph $G_{(xy)}$. In a general form specified in equation 1), G is defined as:

$$G=\{V,E\},$$

$$V=V_{(x)} \cup V_{(y)},$$

$$E=E_{(x)} \cup E_{(y)} \cup E_{(xy)},$$

$$E_{(x)} \subset V_{(x)} \times V_{(x)},$$

$$E_{(y)} \subset V_{(y)} \times V_{(y)},$$

$$E_{(xy)} \subset V_{(x)} \times V_{(y)}. \quad (1)$$

In other words, graph G has two types of heterogeneous vertices, i.e. legislators $V_{(x)}$ and bills $V_{(y)}$, and three types of edges, legislator political relations $E_{(x)}$, bill semantic similarity $E_{(y)}$, and directed vote links $E_{(xy)}$. Detail regarding the estimation of these edge weights and important graph quantities is now described.

It should be understood that in general the heterogeneous graph used for prediction/recommendation problems may include multiple unipartite graphs. In such embodiments, one unipartite graph may have nodes representing an entity, e.g., a person or user, while the other unipartite graph may have nodes representing e.g., a client, a buyer, a seller; while another unipartite graph of the heterogeneous graph may include nodes representing plural items, e.g., a product, or a service, with and the graphs having partially observed connections (links or edges) therebetween.

FIG. 1 depicts a heterogeneous graph representation 10 of roll call data from the Congress of the United States of America. The heterogeneous graph 10 contains nodes or vertices 12 representing a legislator (legislator vertices), bill nodes 15 representing bills before Congress (bill vertices), edges 17 connecting legislators in the graph 10 (i.e., representing a cosponsorship relation), edges 19 connecting bills (i.e., representing semantic similarity), and directed vote edges 22, representing yea votes from legislators to bills and directed vote edges 24, representing nay votes from legislators to bills. The thickness of the edges indicates the strength of the corresponding connections. The heterogeneous graph G contains three subgraphs: legislator graph $G_{(x)}$ 30, bill graph $G_{(y)}$ 40, and a vote graph $G_{(xy)}$ 45.

Legislators Social and Political Relations

Social connections among the members of the House and Senate have been well-studied in fields like social science and political science because they illuminate information for estimating political relevance and revealing the underlying legislative patterns. Different kinds of social connections, such as friendship, family, and acquaintanceship relations, have been identified as important effects on political positions. However, predicting roll call data is about understanding legislators' ideology more than social relationships between them. Therefore, scholars recently proposed to use cosponsorship relations as a more robust and direct way to understand the voting behavior and political influence of each legislator. Briefly speaking, each piece of legislation is uniquely sponsored by a legislator and publicly cosponsored by a group of legislators. Hence, it is fairly straightforward to reveal the cosponsorship edge between each cosponsor and the corresponding sponsor. The system and method for random walking over a heterogeneous graph is particularly interested in this kind of cosponsorship information and uses it to connect the legislators and estimate their political affinity.

More precisely, the pairwise political similarity $w_{(x)_{lm}} \in R$ refers to the affinity between legislators $x_l$ and $x_m$, i.e. the weight of the edge $e_{(x)_{lm}}$. Assuming that legislators $x_l$ and $x_m$ have a total of $c_{lm}$ cosponsored bills in common and have $C_l$ and $C_m$ individually cosponsored bills, then the value of $w_{(x)_{lm}}$ computed from the cosponsorship information is governed by equation 2) as follows:

$$w_{(x)_{lm}} = \frac{c_{lm}}{C_l + C_m}. \quad (2)$$

In addition, the cosponsorship matrix $W_{(x)} = \{w_{(x)_{lm}}\}$ presents an intuitive way to estimate the political connectivity of the legislators. Note that the value of $w_{(x)_{lm}}$ represents the normalized cosponsorship weight between the legislator $x_l$ and $x_m$. For each legislator $x_l$, the sum of such edge weights of all the connected legislators shows the political popularity of this legislator, which is calculated according to equation 3) as:

$$d_{(x)_l} = \sum_m w_{(x)_{lm}} \quad (3)$$

$$= \sum_m \frac{c_{lm}}{C_l + C_m}.$$

From the graph formulation perspective, this quantity is exactly the degree of vertex $x_l$ on the graph $G_{(x)}$. Accordingly, the diagonal degree matrix can be written as $D_{(x)} = \text{diag}[d_{(x)_1}, \ldots, d_{(x)_l}, \ldots, d_{(x)_L}]$.

Semantic Similarity of Bills

In one embodiment, the BOW model represents the textual context using the frequency of the words in documents, while omitting grammar and word order. Given the BOW representation of the n th legislative bill as $y_n = \{y_{n1}, \ldots, y_{nb}, \ldots, y_{nB}\}$, the b th element $y_{nb}$ denotes the count of the corresponding b th entry in the dictionary appearing in the bill. For such a histogram-style feature representation, one can use a kernel function over pairs of vertices to compute the weight $w_{(y)_{nk}}$ for the edge $e_{(y)_{nk}}$ in the bill graph. For example, the Gaussian kernel is often applied to modulate semantic similarity between bill $y_n$ and $y_k$ according to equation 4) as:

$$w_{(y)_{nk}} = \exp\left[-\frac{dis^2(y_n, y_k)}{2\sigma^2}\right], \quad (4)$$

where the function $dis(y_n, y_k)$ evaluates the dissimilarity or distance between bill $y_n$ and $y_k$, and $\sigma$ is the kernel bandwidth parameter. Different choices of the distance function $dis(\bullet)$ may be used as known in the art, e.g., such as $l_p$ (p=1, 2) distance and $\chi^2$ distance. The kernel function based weighting scheme has the flexibility to adapt to a wide range of data with different priors and distributions. However, the determination of bandwidth $\sigma$ is heuristic without any theoretic guarantee. Another weighting function for histogram-style data representation is cosine similarity, which is relatively straightforward to compute according to equation 5) as:

$$w_{(y)_{nk}} = \frac{y_n \cdot y_k}{\|y_n\| \|y_k\|}. \quad (5)$$

Similarly, the degree of the bill vertex $y_n$ can be calculated as $d_{(y)_n} = \Sigma_k w_{(y)_{nk}}$ and the corresponding degree matrix is $D_{(y)} = \text{diag}[d_{(y)_1}, \ldots, d_{(y)_n}, \ldots, d_{(y)_N}]$.

Legislator-Bill Vote Links

A vote is defined as a directed edge $e_{(xy)_{ln}}$, which indicates that the legislator $x_l$ has voted on bill $y_n$. Because there are two types of votes, it is reasonable to set the edge weight $w_{(xy)_{ln}} = 1$ for yea and $w_{(xy)_{ln}} = -1$ for nay. If the vote does not exist, set $w_{(xy)_{ln}} = 0$, indicating no vote edge between $x_l$ and $y_n$. However such straightforward setting of edge weights is infeasible for random walk-based formulations since the edge weight matrix of the graph will eventually be converted to a positive-valued transition probability matrix.

Hence, to partition the yea and nay links, they are treated separately, which results in two legislator-bill vote graphs, namely yea and nay graphs with all positive edge weights. More specifically, for either yea or nay graph, the edge weight is set to one if a vote exists between the corresponding legislator and bill. For non-existent edges, the weights are still set to zero. Finally, there is obtained two weight matrices $W_{(xy)}^{yea}=\{W_{(xy)_{ln}}^{yea}\}$ and $W_{(xy)}^{nay}=\{W_{(xy)_{ln}}^{nay}\}$ for all the yea and nay votes, respectively. Accordingly, four types of vertex degree matrices are defined over the bipartite-style legislator-bill vote graph according to equation 6) as:

$$d_{(xy)_l}^{yea} = \sum_n w_{(xy)_{ln}}^{yea},$$ (6)

$$d_{(xy)_l}^{nay} = \sum_n w_{(xy)_{ln}}^{nay},$$

$$D_{(xy)}^{yea} = \mathrm{diag}[d_{(xy)_1}^{yea}, \ldots, d_{(xy)_l}^{yea}, \ldots, d_{(xy)_L}^{yea}],$$

$$D_{(xy)}^{nay} = \mathrm{diag}[d_{(xy)_1}^{nay}, \ldots, d_{(xy)_l}^{nay}, \ldots, d_{(xy)_L}^{nay}],$$

$$d_{(yx)_n}^{yea} = \sum_l w_{(yx)_{ln}}^{yea},$$

$$d_{(yx)_n}^{nay} = \sum_l w_{(yx)_{ln}}^{nay},$$

$$D_{(yx)}^{yea} = \mathrm{diag}[d_{(yx)_1}^{yea}, \ldots, d_{(yx)_n}^{yea}, \ldots, d_{(yx)_N}^{yea}],$$

$$D_{(yx)}^{nay} = \mathrm{diag}[d_{(yx)_1}^{nay}, \ldots, d_{(yx)_n}^{nay}, \ldots, d_{(yx)_N}^{nay}],$$

where $d_{(x)_l}^{yea}$ and $d_{(x)_l}^{nay}$ indicate the total numbers of yea and nay votes from the legislator $x_l$, and $d_{(y)_n}^{yea}$ and $d_{(y)_n}^{nay}$ are the total number of yea and nay votes received by the bill $y_n$. Hence the priors of yea and nay votes are defined for each legislator and bill based on the given vote links, according to equation 7) as:

$$p_{(x)_l}^{yea} = \frac{d_{(xy)_l}^{yea}}{d_{(xy)_l}^{yea} + d_{(xy)_l}^{nay}},$$ (7)

$$p_{(x)_l}^{nay} = \frac{d_{(xy)_l}^{nay}}{d_{(xy)_l}^{yea} + d_{(xy)_l}^{nay}},$$

$$p_{(y)_n}^{yea} = \frac{d_{(yx)_n}^{yea}}{d_{(yx)_n}^{yea} + d_{(yx)_n}^{nay}},$$

$$p_{(y)_n}^{nay} = \frac{d_{(yx)_n}^{nay}}{d_{(yx)_n}^{yea} + d_{(yx)_n}^{nay}},$$

where $p_{(x)_l}^{yea}$ and $p_{(x)_l}^{nay}$ are the priors that $x_l$ produces yea and nay votes and $p_{(y)_l}^{yea}$, and $p_{(y)_l}^{nay}$, are the priors that $y_n$ receives yea and nay votes.

Recalling the general form of the heterogeneous graph as $G=\{V, E\}$, where $V=V_{(x)} \cup V_{(y)}$ and $E=E_{(x)} \cup E_{(y)} \cup E_{(xy)}$, the edge weight matrix W for G can be defined in a block-wise form according to equation 8) as:

$$W = \begin{bmatrix} W_{(x)} & W_{(xy)} \\ 0 & W_{(y)} \end{bmatrix},$$ (8)

where $W_{(xy)}$ is the weight matrix of the directed legislator-bill vote graph. Since the yea and nay votes are treated separately, W is decomposed into $W^{yea}$ and $W^{nay}$ accordingly according to equation 9):

$$W^{yea} = \begin{bmatrix} W_{(x)} & W_{(xy)}^{yea} \\ 0 & W_{(y)} \end{bmatrix},$$ (9)

$$W^{nay} = \begin{bmatrix} W_{(x)} & W_{(xy)}^{nay} \\ 0 & W_{(y)} \end{bmatrix},$$

where $W^{yea}$ and $W^{nay}$ are the weight matrices of the heterogeneous graphs $G^{yea}$ and $G^{nay}$, respectively.

FIG. 1 illustrates an example of the heterogeneous graph representation of the roll call data. Based on this formulation, the goal of legislative prediction is to infer the missing edges in $E_{(xy)}$ given the legislator graph $G_{(x)}$, bill graph $G_{(y)}$, and the partially observed vote edges, i.e., yea and nay vote links. A two-stage random walk approach to conduct vote prediction using both $W^{yea}$ and $W^{nay}$ is described in further detail below.

Given some observations of the votes, there are two types of legislative prediction tasks: 1) predicting votes missing at random; 2) predicting all votes for new bills. The first task is related to so called "within-matrix" prediction and the second one to "out-of-matrix" prediction. To accomplish such prediction tasks, especially predicting the votes for new bills, two major assumptions are made:

1. Political affinity connects legislative behavior. Legislators who have strong affinity, e.g. strong cosponsorship relations, tend to vote similarly on a set of bills.

2. Legislative behavior is consistent among similar bills. Semantically similar bills tend to receive the same voting results from legislators.

These two assumptions bring two views of predicting the votes along the column and row directions of the weight matrix $W_{(xy)}$. Along the row direction, the vote $w_{(xy)_{ln}}$ is estimated based on the known votes of the most similar bills from the same legislator, while along the column direction, the prediction of $w_{(xy)_{ln}}$ is accomplished based on the observed votes of the same bill generated by the most similar legislators.

In the following, a method of random walks on a heterogeneous graph (RWHG) is presented which combines the clues from the above assumptions and performs two-stage random walks on two unipartite graphs and across a bipartite graph.

Random Walks on Unipartite Graphs

As discussed earlier, there are three subgraphs in the above formulation, two of which, i.e., legislator cosponsorship graph and bill semantic similarity graph, are unipartite with homogeneous vertices. For each of these two subgraphs, a random walk with restart (RWR) model is invoked to derive the steady-state distributions, which indicate the political and semantic relevance among legislators and bills, respectively. Note that during the process of performing RWR, the directed vote links are broken and random walks conducted over these two unipartite graphs independently.

For a standard RWR-based relevance model, a random walker starts from the i th vertex and iteratively jumps to its neighbors with transition probabilities $p_i=\{p_{i1}, \ldots, p_{ij}, \ldots,$ $p_{in}$}. However, for each transition, the random walker returns to the original vertex i with probability 1−α. After achieving the steady-state, the probability of the random walker being at the j th vertex gives the relevance score of vertex j with respect to vertex i. Similarly, if n random walkers are simultaneously launched, one from each vertex of the graph, with transition probabilities $p_1, \ldots, p_n$, the final steady-state probability matrix gives the relevance scores between each pair of vertices. Defining the transition probability matrix P={$p_1, \ldots, p_n$}, one step of RWR from time t to t+1 can be formed according to equation 10) as:

$$R(t+1)=\alpha PR(t)+(1-\alpha)I, \quad (10)$$

where R(t) and R(t+1) are the state probability matrices at time t and t+1 and the identity matrix $I \epsilon R^{n \times n}$ can be treated as the uniform prior for all the vertices. Building on this RWR model, a few revisions are made to adapt to the problem of legislative prediction.

For the legislator graph, it is noted that each legislator has different connectivity with others, resulting in different political influence. Instead of using the uniform prior I the normalized vertex degree $F_{(x)}=\text{diag}[f_{(x)_1}, \ldots, f_{(x)_l}, \ldots, f_{(x)_L}]$ is used as the prior for each legislator, where diagonal entries are computed in equation 11) as:

$$f_{(x)_l} = \frac{d_{(x)_l}}{\sum_m d_{(x)_m}}, \quad (11)$$

$$l = 1, \ldots, L.$$

The transition probability $P_{(x)}$ is computed as the row-normalized weight matrix: $P_{(x)}=D_{(x)}^{-1}W_{(x)}$. Then, the following transition equation 12) is obtained:

$$R_{(x)}(t+1)=\alpha P_{(x)}R_{(x)}(t)+(1-\alpha)F_{(x)}, \quad (12)$$

The steady-state probability, denoted $R_{(x)}=R_{(x)}(\infty)=\{r_{(x)_{lm}}\}$, is then derived by solving the above discrete difference equations with t→∞ as in equation 13):

$$R_{(x)}=(1-\alpha)(I-\alpha P_{(x)})^{-1}F_{(x)}. \quad (13)$$

Each element $r_{(x)_{lm}}$ represents the political relevance score of the legislator $x_m$ with respect to $x_l$. Note that $r_{(x)_{lm}} \neq r_{(x)_{ml}}$ and $R_{(x)}$ is asymmetric.

Similarly, for the bill graph, the prior $F_{(y)}$ and transition probability $P_{(y)}$ are set according to equation 14) as:

$$F_{(y)} = \text{diag}[f_{(y)_1}, \ldots, f_{(y)_l}, \ldots, f_{(y)_N}], \quad (14)$$

$$f_{(y)_n} = \frac{d_{(y)_n}}{\sum_k d_{(y)_k}},$$

$$n = 1, \ldots, N,$$

$$P_{(y)} = D_{(y)}^{-1}W_{(y)},$$

and the final relevance matrix $R_{(y)}$ derived from the steady-state is computed as equation 15) (similar to equation 13)) as:

$$R_{(y)}=(1-\beta)(I-\beta P_{(y)})^{-1}F_{(y)}, \quad (15)$$

where 1−β is the restart probability for the RWR in $G_{(y)}$. Thus, in the methods described herein, the vertex prior and transition probability computations are revised to adapt the standard random walk with restart model to the present problem. Then through performing RWR over the legislator graph and bill graph independently, two relevance matrices are derived: $R_{(x)}$ representing the political relevance among legislators, and $R_{(y)}$ representing semantic relevance of bills.

Random Walks Across Bipartite Graphs

Given the derived relevance matrices $R_{(x)}$ and $R_{(y)}$ from the random walk over the legislator cosponsorship graph and the bill semantic similarity graph, the next step includes predicting the possible link from a legislator $x_l$ to a bill $y_n$. From the view of random walk, the goal is to estimate the transition chance of a random walker starting from vertex $x_l$ and transiting to $y_n$. However, different from the random walk model used in the case of unipartite graphs, where the walker only performs random transitions in a unipartite graph, here the random walker has to cross a bipartite graph through the existing vote links. There are two possible paths for a random walker across the vertices of the bipartite graph, i.e. transiting from legislator $x_l$ to bill $y_n$.

1. Political relevance-based transition. Based on the political relevance information, the random walker first performs transition from $x_l$ to $x_m$, where $x_m$ has an observed vote link $e_{(xy)_{mn}}$. Then the walker can easily transit to $y_n$ through the existing vote link.

2. Semantic relevance-based transition. The random walker first transits from $x_l$ to $y_k$ based on the existing vote link $e_{(xy)_{lk}}$. Then the random walk is performed within $G_{(y)}$, resulting in a jump from $y_k$ to $y_n$ based on the semantic relevance.

Finally, the estimation of the transition chance involves a heterogeneous grph, including two types of vertices, i.e., $V_{(x)}$ and $V_{(y)}$, and three types of edges, $E_{(x)}$, $E_{(y)}$, and $E_{(xy)}$. It is noted that the above two transition paths are related to the two earlier made assumptions. Finally, the estimation of the transition chance involves a heterogeneous graph, across two types of vertices through three types of edges. Before providing the formulation of the above random walks over a bipartite graph, the transition probability is first defined as $P_{(xy)}=\{p_{(xy)_{ln}}\}$ from the given vote links $E_{(xy)}=\{e_{(xy)_{ln}}\}$ and weights $W_{(xy)}=\{w_{(xy)_{ln}}\}$. Similar to the unipartite graph-based random walk, the transition probability for the bipartite graph is computed as the row-normalized weight matrix. Since two bipartite graphs $G_{(xy)}^{yea}$ and $G_{(xy)}^{nay}$ are derived for the yea and nay votes separately, accordingly there is two transition probability matrices $P_{(xy)}^{yea}=\{P_{(xy)_{ln}}^{yea}\} P_{(xy)}^{nay}=\{P_{(xy)_{ln}}^{nay}\}$ set forth in equation 16) as follows:

$$P_{(xy)}^{yea}=D_{(xy)}^{yeah^{-1}}W_{(xy)}^{yea}$$

$$P_{(xy)}^{nay}=D_{(xy)}^{nay^{-1}}W_{(xy)}^{nay} \quad (16)$$

where the elements $p_{(xy)_{ln}}^{yea}$ and $p_{(xy)_{ln}}^{nay}$ represent the transition probability from $x_l$ to $y_n$ over graphs $G_{(xy)}^{yea}$ and $G_{(xy)}^{nay}$, respectively. Considering the above transition paths, there is performed estimating the transition probabilities $p_{(xy)_{ln}}^{yea}$ and $p_{(xy)_{ln}}^{nay}$ of one step random walk over $G_{(xy)}^{yea}$ and $G_{(xy)}^{nay}$ according to equation 17) as:]

$$p_{(xy)_{ln}}^{yea} = \gamma \sum_m r_{(x)_{lm}} p_{(xy)_{mn}}^{yea} + (1-\gamma) \sum_k p_{(xy)_{lk}}^{yea} r_{(y)_{kn}} \quad (17)$$

$$p_{(xy)_{ln}}^{nay} = \gamma \sum_m r_{(x)_{lm}} p_{(xy)_{lm}}^{nay} + (1-\gamma) \sum_k p_{(xy)_{lk}}^{nay} r_{(y)_{kn}}$$

where the first summation gives the transition probability from $x_l$ to $y_n$ through the political relevance path, and the second summation gives the transition probability via the semantic relevance path. The coefficient $0 \leq \gamma \leq 1$ is the probability that the random walker will take the first transition path.

The matrix form of the above equation 17) is given showing the update of transition probability of vote links from time t to time t+1 according to equation 18) as:

$$P_{(xy)}^{yea}(t+1) = \gamma R_{(x)} P_{(xy)}^{yea}(t) + (1-\gamma) P_{(xy)}^{yea}(t) R_{(y)}$$

$$P_{(xy)}^{nay}(t+1) = \gamma R_{(x)} P_{(xy)}^{nay}(t) + (1-\gamma) P_{(xy)}^{nay}(t) R_{(y)} \quad (18)$$

Due to the existence of the bipartite graph, the above random walk rule is significantly different than the one over unipartite graph. For instance, for a non-bipartite based random walk, the final distribution when $t \to \infty$ tends to a stationary distribution. However, for a bipartite graph with bipartition $\{V_{(x)}, V_{(y)}\}$, the final distribution could oscillate between the prior distributions of $V_{(x)}$ and $V_{(y)}$ without achieving a steady-state. Since the formulation of equation 18) involves both transitions within each unipartite graph and across the bipartite graph, the final results are even more complicated to state. In addition, the prediction of new vote links changes the structure of the bipartite graph, and makes efforts to derive the final distribution of such steady-state intractable. Therefore, a new iterative approach is used to gradually produce the vote prediction results.

Iterative Prediction of Volte Links

As described herein, two legislator-bill vote graphs $G^{yea}$ and $G^{nay}$ using yea and nay votes have been constructed separately. Accordingly, two separate random walks should be performed over these two graphs using the transition probability update rules in equation 18). For one step of random walk from time t to t+1, two new transition matrices $P_{(xy)}^{yea}(t+1)$ and $P_{(xy)}^{nay}(t+1)$ are derived, where the elements $p_{(xy)_{ln}}^{yea}, p_{(xy)_{ln}}^{nay}$ measure the chance of yea and nay result for $x_l$ voting on $y_n$. In the iterative procedure of vote prediction described herein, the vote links are gradually completed in a greedy way, in which only the most confident prediction are used to create the new vote links. To achieve this, the method performs normalizing the transition probabilities over the two graphs to derive the posterior probability $P_{ln} = \{P_{ln}^{yea}, P_{ln}^{nay}\}$, representing the probability for $x_l$ to vote $y_n$ with yea and nay, respectively, according to equation 19) as:

$$P_{ln}^{yea} = \frac{p_{(xy)_{ln}}^{yea}}{p_{(xy)_{ln}}^{yea} + p_{(xy)_{ln}}^{nay}},$$

$$P_{ln}^{nay} = \frac{p_{(xy)_{ln}}^{nay}}{p_{(xy)_{ln}}^{yea} + p_{(xy)_{ln}}^{nay}}, \quad (19)$$

Then the uncertainty of the prediction of vote from $x_l$ to $y_n$ is measured by the mutual information $I(x_l, y_n)$ according to equation 20) as:

$$I(x_l, y_n) = \sum_{x_l} \sum_{y_n} \frac{p(x_l, y_n)}{p(x_l) p(y_n)}. \quad (20)$$

where $p(x_l, y_n)$ is the joint probability distribution and the marginal probabilities are $p(x_l)$, $p(y_n)$. In this formulation, $p(x_l, y_n)$ refers to the probability of the yea and nay vote edge as shown in equations (19). The value $p(x_l)$ is interpreted as the probability of $x_l$ giving yea and nay votes, and $p(y_n)$ is the probability of $y_n$ receiving yea and nay votes, which are estimated as the priors in equation (7). Therefore, the mutual information $I(x_l, y_n)$ is approximately computed according to equation 21) as:

$$I(x_l, y_n) \approx P_{ln}^{yea} \log \frac{P_{ln}^{yea}}{p_{(x)_l}^{yea} p_{(y)_n}^{yea}} + P_{ln}^{nay} \log \frac{P_{ln}^{nay}}{p_{(x)_l}^{nay} p_{(y)_n}^{nay}}. \quad (21)$$

For each possible prediction of vote links, the above mutual information is computed and the one associated with maximum value is chosen. Then a new vote link is accordingly generated to $G_{(xy)}^{yea}$ or $G_{(xy)}^{nay}$ based on which one has higher posterior probability. This one steep greedy assignment for vote link prediction is written according to equations 22) as:

$$(l^*, n^*) = \operatorname{argmax}_{l,n} I(x_l, y_n) \quad (22)$$

$$P_{l^*n^*}^{yea} > P_{l^*n^*}^{nay} \Rightarrow w_{(xy)_{l^*n^*}}^{yea} = 1,$$

$$P_{l^*n^*}^{yea} < P_{l^*n^*}^{nay} \Rightarrow w_{(xy)_{l^*n^*}}^{nay} = 1,$$

Finally, with the updated $G_{(xy)}^{yea}$ or $G_{(xy)}^{nay}$, the corresponding transition matrix $P_{(xy)}^{yea}$ or $P_{(xy)}^{nay}$ is recomputed for the next random walk step. Through iteratively performing this random walk, where in each step the bipartite vote graph is updated with more links, all the missing vote links are gradually completed. FIG. 2 summarizes the heterogeneous graph-based random walk method and algorithm for predicting legislative votes.

Particularly, FIG. 2 illustrates an algorithm 100 to perform Iterative Vote Link Prediction through Random Walk over a Heterogeneous Graph in one embodiment. As shown in FIG. 2, the method 100 first includes, at 105, constructing a legislator graph $G_{(x)} = \{V_{(x)}, E_{(x)}, W_{(x)}\}$, constructing a bill graph $G_{(y)} = \{V_{(y)}, E(y), W_{(y)}\}$, and constructing vote graphs $G_{(xy)}^{yea} = \{V_{(x)} \cup V_{(y)}, E_{(xy)}^{yea}, W_{(xy)}^{yea}\}$ and $G_{(xy)}^{nay} = \{V_{(x)} \cup V_{(x)}, E_{(xy)}^{nay}, W_{(xy)}^{nay}\}$ as described herein. While the graphs set forth relate to the legislator vote prediction, it is understood that the principles described herein are applicable to any heterogeneous graph form used for recommendation or prediction problem. Then, in the manner described herein, there is performed computing transition probabilities $P_{(x)}$ and $P_{(y)}$ at 110 governing transition of a random walker starting from an i th vertex and iteratively jumping to its neighbors. Then at 115, there is performed deriving steady-state distributions $R_{(x)}$ representing the political relevance among legislators and $R_{(y)}$ representing the semantic relevance of bills. At 117, the random walker iteration counter is initialized, e.g., to t=0. Then, at 119 the method performs computing the initial bipartite graph transition probability matrices $P_{(xy)}^{yea}(t)$ and $P_{(xy)}^{nay}(t)$, e.g., using equation 16). Then, commencing an iterative loop 130, there is performed at each iteration the following: computing at 120, the bipartite graph transition probability matrices $P_{(xy)}^{yea}(t+1)$ and $P_{(xy)}^{nay}(t+1)$ using equations (18). Then at 122 there is performed estimating the posterior probabilities $P_{ln}^{yea}$ and $P_{in}^{nay}$ for each possible vote link using equation 19. Then at 124 there is performed, for each possible prediction vote link, estimating the mutual information $I(x_l, y_n)$ of the legislator and bill vertices using equation 20). Then at 126, there is performed updating the vote link $W_{(xy)}^{yea}$ or $W_{(xy)}^{yea}$ from the prediction with maximum mutual information, as in equations 22). Then at 127 there is performed updating the iteration counter: t=t+1 and at 129, computing the $P_{(xy)}^{yea}(t)$ or $P_{(xy)}^{nay}(t)$ with the new vote graphs. The processes in steps 120 to 127 are repeated as iterative loop 130 until all missing vote links are completed. At 135, a final output of the iterative procedure are the complete vote links $W_{(xy)}^{yea}$ and $W_{(xy)}^{nay}$.

In a further embodiment, the novel random walk model with heterogeneous graphs methods and system described herein is implemented to leverage multiple source data and accomplish challenging prediction tasks for managing complex relational data, such as Buying-Selling Relations. That is, many predictive analytics problems in business intelligence involve a variety of different types of data. Currently, in today's interconnected world, buying/selling relations take form of complex hybrid networks. In such a setting, managing the buying/selling processes, and using the information on the network(s) optimally for business decision making (e.g. recommendation of cross-selling and up-selling) is difficult. In order to build a predictive model to generate such types of sales recommendations, one might consider both the relationships between clients and the attributes of clients' industry and the characteristics of the products. Besides predicting who might buy which product, estimating the influence of entities (e.g. vendors (sellers) or clients (customers)) is also very important for decision support.

Figure 3:
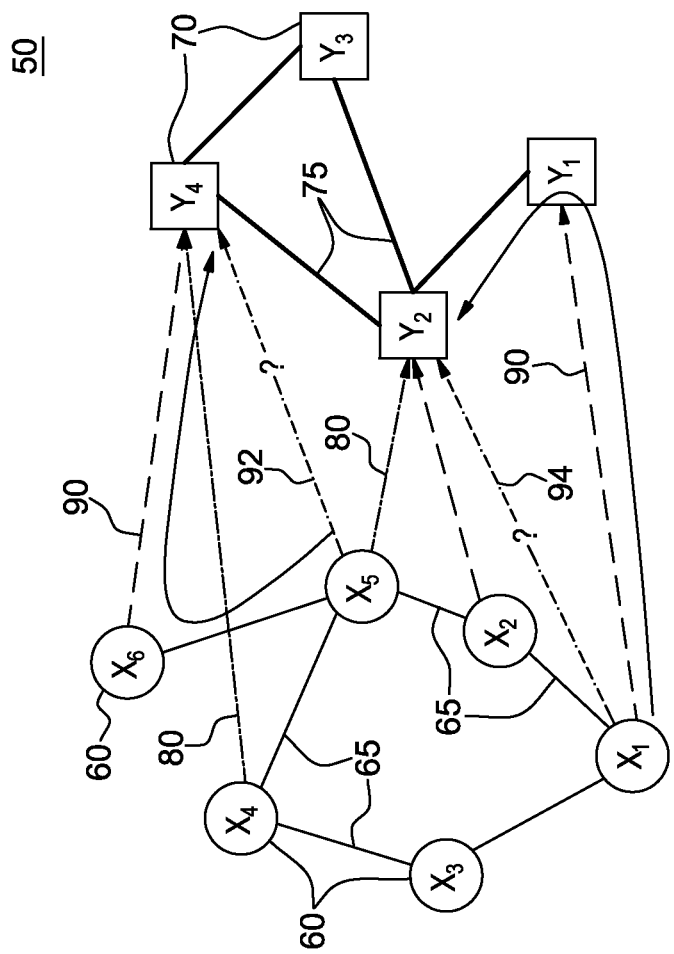
FIG. 3 illustrates a generic method and system used to manage buying-selling relations across different types of connections in a heterogeneous graph-based representation 50 in one embodiment.

For example, many different types of corporations and organizational structures need to manage complex hybrid buyer-seller networks. In one example, for a large global company that has a large salesforce for business-to-business selling, in this example, there are connections between clients if they share business partnerships, are in the same industry or sector, share strategy, have board members or executives in common, etc. There are also connections between the different salespeople based on working on teams together, communicating via social media, having the same job role, etc. Furthermore, there are connections between products and services as typically being part of the same solution, having similar function, etc. Additionally, there are connections between different pieces of marketing collateral based on semantic similarity, etc. The hybrid buying-selling network as represented generically by a heterogeneous graph 50 of FIG. 3 connects these different types of nodes: clients, salespeople, products, and marketing collateral, based on successful and unsuccessful interactions such as a salesperson using a particular piece of marketing collateral to sell a particular product to a particular client. Example recommendations that may be obtained from such networks such as shown in FIG. 3 are of the same form: which salesperson should a company recommend to sell what product using which piece of collateral to which client.

In a further example, a large retailer with many store locations whose managers have some liberty in stocking and purchasing decisions for their stores, in this example, the product suppliers, the products, the stores, and physical shelf locations within the store are all different types of nodes. Recommendations take the form of which products should a store purchase from whom and display where. Consumer demographics and other similarities connect stores (business enterprises) in this example.

A similar third example is a producer or manufacturer with a large global network of independent dealers. In this case, there is no network of product suppliers, but there is marketing collateral and individual salespeople. The decisions are similar to the other examples.

The method and system described herein is thus used to manage buying-selling relations across different types of connections. As shown in view of FIG. 3, the method includes two key components:

1) constructing the heterogeneous graph 50 including heterogeneous instances of abstract objects as graph nodes 60 and, for example, multiple client relations as edges 65 connecting those nodes. For instance, in a typical business analytics application, the graph nodes 60 may represent sellers and clients. Graph nodes 70 may represent products and/or services and multiple product associations as edges 75 connecting those nodes. The different types of relations, such as buy-seller relation and client product relation, are quantified as the weights of edges connecting those instances. Further, directed edges 80 between a node 60 and node 70 may represent a selling transaction, while directed edges 90 between a node 60 and node 70 may represent a buying transaction.

2) launching a multi-stage novel random walk model over the heterogeneous graph to accomplish prediction tasks with such rich information. The random walk within a subgraph with homogenous nodes usually produces the relevance between instances from the same type of objects. The random walk across different type of nodes adds new connections dynamically to provide the prediction of decisions, such as a client making a purchase of a product. That is, the heterogeneous graph with random walk modeling predicts edges to recommend new relevant connections.

Thus, in view of FIG. 3, the system and methods herein finds good new (i.e., not yet existing) business connections between different types of entities (e.g., actions, recommendations, outcomes, predictions), as represented by unknown connections 92 and 94 thereby driving business value.

Figure 4:
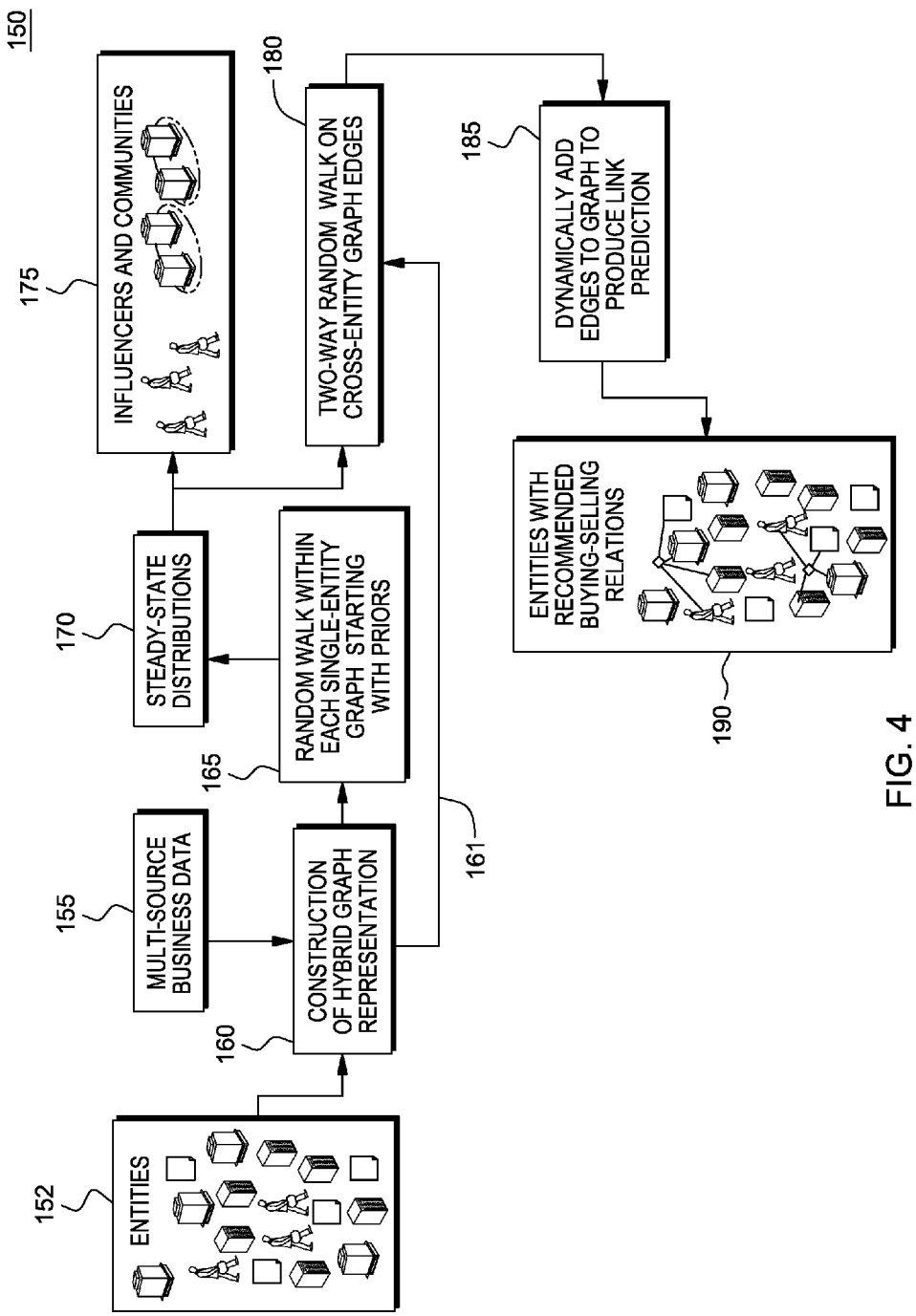
FIG. 4 depicts generally a system 150 used to manage buying-selling relations for multiple types of entities (in one or more entity graphs) across different types of connections shown in the example heterogeneous graph 50 of FIG. 3.

FIG. 4 depicts generally a system 150 used to manage buying-selling relations 190 for multiple types of entities 152 (in one or more entity graphs) across different types of connections shown in the example heterogeneous graph 50 of FIG. 3. Using a computer device having a programmed processor such as described herein with respect to FIG. 5, the system performs: constructing the heterogeneous graphs at 160 to represent the accessed multi-source business data 155, including the existing within-entity edges, and existing cross-entity edges entity product relations (directed edges). From the graphs, using the computer system, there is performed the random walk starting with priors within each single-entity graph at 165. From within each single-entity graph, there is derived at 170 the steady-state distributions a descriptive analysis of influence and identifying communities 175. Using the steady-state distributions (from the single-entity graphs) and the heterogeneous graph representation 161, the computer system performs the two-way random walk across entity graphs at 180. At this step, there are dynamically added edges to the graph to product link prediction at 185 (e.g., a predictive analysis of generating sales recommendation).

Generally, from FIGS. 3 and 4, and the processing described herein, the generating of predictions for decision support include the performing random walk over unipartite graphs to derive stationary distributions (static); the iterative performing two-way random walk across the unipartite graphs (dynamic); and the measuring the confidence of the produced prediction links and updating of the graph structure accordingly. Thus, in view of FIG. 4, outcomes or predictions may be determined such as, e.g., 1) Which seller should sell which product to which company using which piece of marketing collateral? 2) If a seller has previously successfully sold to a company, then he or she may be able to successfully sell to another company closely connected to that company; 3) Moreover, another seller closely connected to this seller may be able to successfully sell to that other company.

With the methodology, one can 1) perform the predictive analysis simultaneously using multiple type relational data and attribute data without data aggregation or simplification, avoiding information loss; and 2) perform descriptive analysis of the influence estimate in a joint space of multiple types of entities.

Thus, the system and method described herein, makes use of rich relational and transactional information including: within-entity connections (including ones from social media, e.g., social connections, similarities and friendships) including identifying influencers and communities in each entity space to provide additional valuable information for decision support; and already existing cross-entity connections. The cross-entity connections include, but are not limited to: actions, recommendations, outcomes and predictions, etc. that are useful for applications involving Buyer-seller relationships; Expertise location; Market intelligence; Marketing; collateral recommendation; Business partnerships, mergers, and acquisitions; and Legislative vote prediction.

The system and method described herein can further be applied to the applications in biological and biomedical domains, such as validating a hypothesis between a prototype and a gene.

Figure 5:
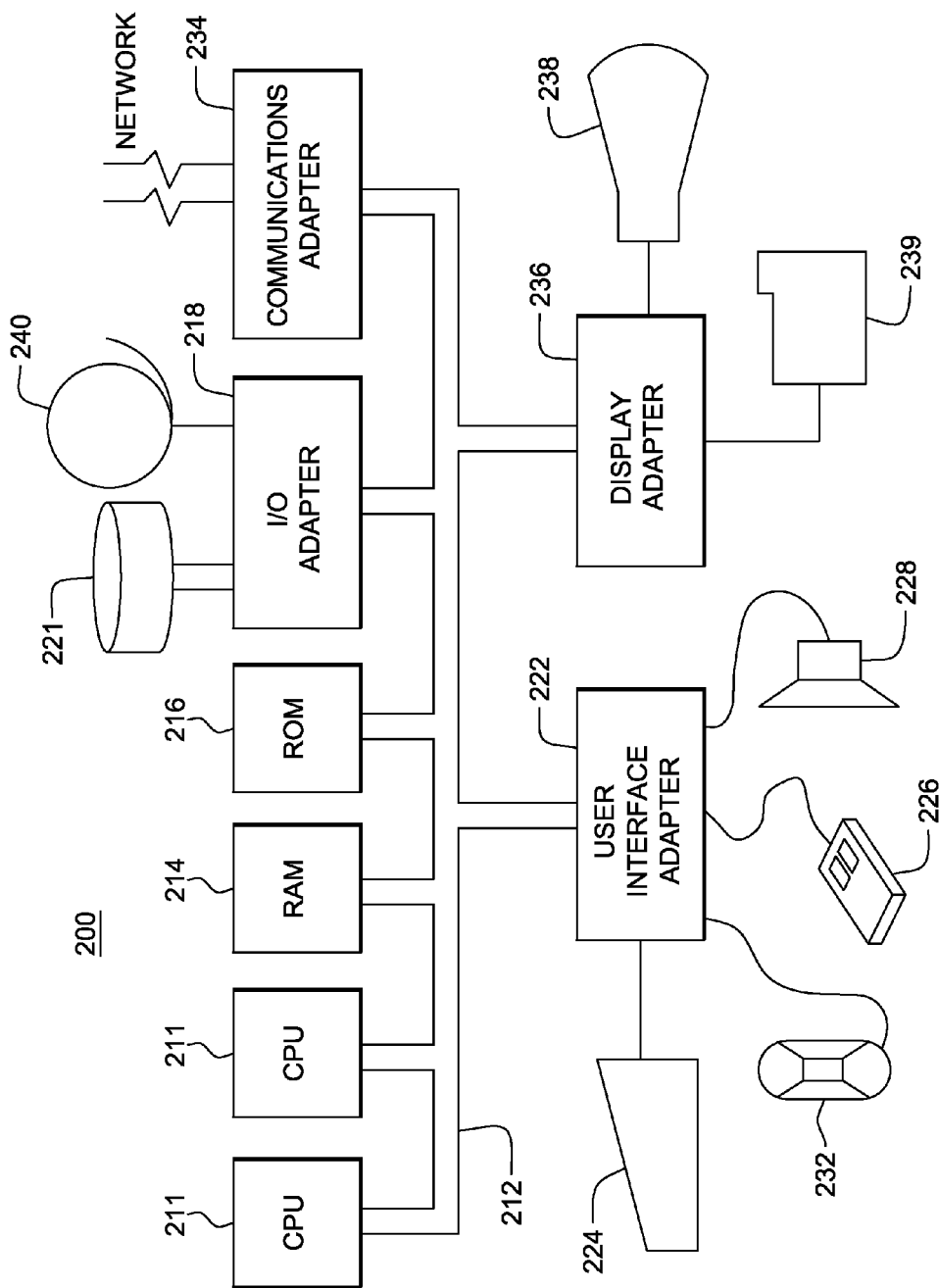
FIG. 5 illustrates a portion of a computer system 200, including a CPU and a conventional memory in which the method and system herein may be embodied.

FIG. 5 illustrates an exemplary hardware configuration of a computing system infrastructure 200 in which the present method is run. In one aspect, computing system 200 receives the data and performs the method processing steps of FIG. 5, for example. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, disk drive device 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be utilized. The tangible computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. The computer readable medium excludes only a propagating signal.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for predicting a relation between entities comprising:
   a memory storage device;
   a computer system associated with said memory storage device, said computer system including a processor device configured to perform a method to:
      construct, at a computer device, a heterogeneous graph representation of multi-source data including:
         receiving data for forming multiple unipartite sub-graphs, each sub-graph having homogeneous vertices and edges connecting said vertices, and
         receiving data for forming bipartite sub-graphs having partially observed edges connecting respective nodes between any two different unipartite sub-graphs, said partially observed edges representing cross-entity links;
      compute at said computer device, a steady-state relevance matrix for each sub-graph using a homogeneous Markov Random Walk model applied to each said unipartite sub-graph, wherein to apply said homogeneous Markov Random Walk model, said processor device is further configured to compute a transition probability matrix for each said unipartite sub-graph, said computing said steady-state relevance matrix associated with a respective unipartite sub-graph based on a respective computed transition probability matrix; and said processor device is further configured to compute state probability matrices at transition times t and t+1, where a computed state probability matrix at time t+1 is a function of a computed state probability matrix at time t, said computed transition probability matrix, a computed matrix representing a uniform prior state for all the vertices of said a unipartite graph, and for a modeled random walker time transition between vertices in said sub-graph, a restart probability value for said unipartite sub-graph;
      dynamically generate missing edges connecting vertices between each of two unipartite sub-graphs by applying, using said computed steady-state relevance matrix for each sub-graph, an iterative and heterogeneous Markov Random Walk model to said bipartite sub-graphs to dynamically generate missing edges, wherein a generated missing edge represents a cross-entity connection recommendation or prediction in said heterogeneous graph, and wherein
   a first unipartite sub-graph type of said multiple unipartite sub-graphs comprises vertices representing a plurality of different users,
   a second unipartite sub-graph type of said multiple unipartite sub-graph comprises vertices representing a plurality of items, and
   a third unipartite sub-graph type of multiple unipartite sub-graph comprises vertices representing a plurality of different entity types;
   wherein edges connecting a sub-set of different vertices in said first type of unipartite sub-graph have different edge weights according to observed user affinity measures between different users,
   wherein edges connecting a sub-set of different vertices in said second type of unipartite graph have different edge weights according to observed item similarity measures between different items; and
   edges connecting a sub-set of different vertices of said third type unipartite graph have different edge weights according to observed measures describing relationships between different entities;
   wherein a computed steady-state relevance matrix associated with said first type of unipartite sub-graph is a function of a transition probability computed for the users, and a computed normalized matrix representing an affinity of the user to other users as represented in said first type unipartite graph,
   a computed steady-state relevance matrix associated with said second type of unipartite sub-graph is a function of a transition probability matrix for the items, and a computed normalized matrix representing a similarity of an item to other items as represented in said second type unipartite graph, and a restart probability value for said second type sub-graph; and,
   a computed steady-state relevance matrix associated with said third entity type unipartite sub-graph is a function of a transition probability matrix for the entities, a computed normalized matrix representing a similarity of an entity to other entities in said entity type of unipartite graph, and a restart probability in said entity sub-graph.

2. The system of claim 1, wherein said applying said iterative heterogeneous Markov Random Walk model comprises: at each iteration, traversing a bipartite graph through said partially observed edges to dynamically generate said missing edges.

3. The system of claim 1, wherein said dynamically generating said missing edges by applying said iterative and heterogeneous Markov Random Walk model to said bipartite graph comprises:
   computing a first bipartite graph for partially observed edges representing positive cross-entity links that connect between vertices of a first unipartite sub-graph and vertices of a second unipartite sub-graph;
   deriving a second bipartite graph for partially observed edges representing negative cross-entity links that connect between nodes of said first unipartite sub-graph and nodes of said second unipartite sub-graph; and
   computing an initial positive bipartite graph transition probability matrix and an initial negative bipartite graph transition probability matrix corresponding to respective said dervied first bipartite and second bipartite graphs.

4. The system of claim 3, wherein said dynamically generating said missing edges by applying said said iterative Random Walk model to said bipartite graph comprises, at each iteration:

deriving, for one step of random walk from time t to time t+1, for each respective said positive and negative bipartite graphs and, respective positive and negative bipartite graph transition probability matrices at time (t+1) and wherein elements of each said respective first and second bipartite graph transition probability matrices measure a probability of a cross-entity link defining of a new edge between verticees in said unipartite graphs;

estimating a respective positive and negaitve posterior probability and for each cross-entity link recommendation or prediction for said new edge between a node $x_l$ in said first unipartite graph to node $y_n$ in said second unipartite graph;

measuring an uncertainty of each possible cross-entity connection prediction as a mutual information approximation $I(x_l, y_n)$, said mutual information approximation $I(x_l, y_n)$ being a function of said positive and negative posterior probabilities and;

choosing a maximum mutual information approximation $I(x_l, y_n)$ value among each possible binary classification prediction of the new edge;

generating said new binary classfied edge in either said first bipartite graph or second bipartite graph based on its posterior probability value;

updating corresponding said initial first bipartite graph transition probability matrix at time (t) or said initial second bipartite graph transition probability matrix at time (t) with said generated new cross-entity connection; and, repeating said deriving, estimating, measuring, choosing, generating and updating steps for each iteration to dynamically generate substantially all missing edges of said heterogeneous graph.

5. A computer readable storage medium tangibly embodying a program of instructions executable by the computer for predicting a relation between entities, the program of instructions, when executing, performing the following steps:

constructing a heterogeneous graph representation of multi-source data including:

receiving data for forming multiple unipartite sub-graphs, each sub-graph having homogeneous vertices and edges connecting said vertices, and receiving data for forming bipartite sub-graphs having partially observed edges connecting respective nodes between any two different unipartite sub-graphs, said partially observed edges representing cross-entity links;

computing a steady-state relevance matrix for each sub-graph using a homogeneous Markov Random Walk model applied to each said unipartite sub-graph, wherein said applying said homogeneous Markov Random Walk model comprises:

computing a transition probability matrix for each said unipartite sub-graph, said computing said steady-state relevance matrix associated with a respective unipartite sub-graph based on a respective computed transition probability matrix; and computing state probability matrices at transition times t and t+1, where a computed state probability matrix at time t+1 is a function of a computed state probability matrix at time t, said computed transition probability matrix, a computed matrix representing a uniform prior state for all the vertices of said a unipartite graph, and for a modeled random walker time transition between vertices in said sub-graph, a restart probability value for said unipartite sub-graph; and dynamically generating missing edges connecting vertices between each of two unipartite sub-graphs by applying, using said computed steady-state relevance matrix for each sub-graph, an iterative and heterogeneous Markov Random Walk model to said bipartite sub-graphs to dynamically generate missing edges, wherein a generated missing edge represents a cross-entity connection recommendation or prediction in said heterogeneous graph, and wherein a first unipartite sub-graph type of said multiple unipartite sub-graphs comprises vertices representing a plurality of different users, a second unipartite sub-graph type of said multiple unipartite sub-graph comprises vertices representing a plurality of items, and a third unipartite sub-graph type of multiple unipartite sub-graph comprises vertices representing a plurality of different entity types;

wherein edges connecting a sub-set of different vertices in said first type of unipartite sub-graph have different edge weights according to observed user affinity measures between different users, wherein edges connecting a sub-set of different vertices in said second type of unipartite graph have different edge weights according to observed item similarity measures between different items; and edges connecting a sub-set of different vertices of said third type unipartite graph have different edge weights according to observed measures describing relationships between different entities;

wherein a computed steady-state relevance matrix associated with said first type of unipartite sub-graph is a function of a transition probability computed for the users, and a computed normalized matrix representing an affinity of the user to other users as represented in said first type unipartite graph, a computed steady-state relevance matrix associated with said second type of unipartite sub-graph is a function of a transition probability matrix for the items, and a computed normalized matrix representing a similarity of an item to other items as represented in said second type unipartite graph, and a restart probability value for said second type sub-graph; and, a computed steady-state relevance matrix associated with said third entity type unipartite sub-graph is a function of a transition probability matrix for the entities, a computed normalized matrix representing a similarity of an entity to other entities in said entity type of unipartite graph, and a restart probability in said entity sub-graph.

6. The computer readable storage medium of claim 5, wherein said applying said iterative heterogeneous Markov Random Walk model comprises: at each iteration, traversing a bipartite graph through said partially observed edges to dynamically generate said missing edges.

7. The system of claim 5, wherein said dynamically generating said missing edges by applying said iterative and heterogeneous Markov Random Walk model to said bipartite graph comprises:

computing a first bipartite graph for partially observed edges representing positive cross-entity links that connect between vertices of a first unipartite sub-graph and vertices of a second unipartite sub-graph;

deriving a second bipartite graph for partially observed edges representing negative cross-entity links that connect between nodes of said first unipartite sub-graph and nodes of said second unipartite sub-graph; and computing an initial positive bipartite graph transition probability matrix and an initial negative bipartite graph transition probability matrix corresponding to respective said dervied first bipartite and second bipartite graphs.

8. The computer readable storage medium of claim 7, wherein said dynamically generating said missing edges by applying said said iterative Random Walk model to said bipartite graph comprises, at each iteration:

deriving, for one step of random walk from time t to time t+1, for each respective said positive and negative bipartite graphs and, respective positive and negative bipartite graph transition probability matrices at time (t+1) and wherein elements of each said respective first and second bipartite graph transition probability matrices measure a probability of a cross-entity link defining of a new edge between verticees in said unipartite graphs;

estimating a respective positive and negaitve posterior probability and for each cross-entity link recommendation or prediction for said new edge between a node $x_l$ in said first unipartite graph to node $y_n$ in said second unipartite graph;

measuring an uncertainty of each possible cross-entity connection prediction as a mutual information approximation $I(x_l, y_n)$, said mutual information approximation $I(x_l, y_n)$ being a function of said positive and negative posterior probabilities and;

choosing a maximum mutual information approximation $I(x_l, y_n)$ value among each possible binary classification prediction of the new edge;

generating said new binary classfied edge in either said first bipartite graph or second bipartite graph based on its posterior probability value;

updating corresponding said initial first bipartite graph transition probability matrix at time (t) or said initial second bipartite graph transition probability matrix at time (t) with said generated new cross-entity connection; and, repeating said deriving, estimating, measuring, choosing, generating and updating steps for each iteration to dynamically generate substantially all missing edges of said heterogeneous graph.

* * * * *